United States Patent
Bower et al.

(10) Patent No.: US 7,126,094 B2
(45) Date of Patent: Oct. 24, 2006

(54) SURFACE MOUNT HEATER

(75) Inventors: Michael Joseph Bower, San Jose, CA (US); Roger Dean Chase, Santa Clara, CA (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 10/981,856

(22) Filed: Nov. 5, 2004

(65) Prior Publication Data
US 2005/0109771 A1 May 26, 2005

Related U.S. Application Data

(60) Provisional application No. 60/518,357, filed on Nov. 7, 2003.

(51) Int. Cl.
*H05B 3/44* (2006.01)
(52) U.S. Cl. .................. 219/544; 219/543; 219/538
(58) Field of Classification Search .............. None
See application file for complete search history.

(56) References Cited

U.S. PATENT DOCUMENTS

| | | | |
|---|---|---|---|
| 3,336,557 | A | 8/1967 | Lund et al. |
| 4,717,812 | A | 1/1988 | Makita et al. |
| 5,667,712 | A | 9/1997 | Sutorius et al. |
| 5,713,582 | A | 2/1998 | Swensen et al. |
| 5,714,738 | A | 2/1998 | Hauschulz et al. |
| 5,730,448 | A | 3/1998 | Swensen et al. |
| 5,735,532 | A | 4/1998 | Nolan et al. |
| 5,735,533 | A | 4/1998 | Nolan et al. |
| 5,836,355 | A | 11/1998 | Markulec et al. |
| 5,984,318 | A | 11/1999 | Kojima et al. |
| 5,992,463 | A | 11/1999 | Redemann et al. |
| 6,102,068 | A | 8/2000 | Higdon et al. |
| 6,124,579 | A | 9/2000 | Steinhauser et al. |
| 6,147,335 | A | 11/2000 | Von Arx et al. |
| 6,233,398 | B1 | 5/2001 | Rutherford et al. |
| 6,263,158 | B1 | 7/2001 | Rutherford |
| 6,283,155 | B1 | 9/2001 | Vu |
| 6,293,310 | B1 | 9/2001 | Redemann et al. |

(Continued)

FOREIGN PATENT DOCUMENTS

EP     1 273 839 A     1/2003

OTHER PUBLICATIONS

Perkin Elmer Semiconductor UHV-UHP Marketing Material, Mar. 15, 2002, 10 pages.

(Continued)

*Primary Examiner*—Thor S. Campbell
(74) *Attorney, Agent, or Firm*—Lowrie, Lando & Anastasi, LLP

(57) ABSTRACT

A heater that includes a substantially flat layer of electrical resistance material having a first end and a second end, a first electrical conductor electrically connected to the first end of the substantially flat layer of electrical resistance material, a second electrical conductor electrically connected to the second end of the substantially flat layer of electrical resistance material, and an electrically insulating material surrounding the substantially flat layer of electrical resistance material and electrically insulating the first end of the substantially flat layer of electrical resistance material from the second end of the substantially flat layer of electrical resistance material. The heater may be mounted to a surface of a fluid component and used to heat the fluid component, and where the heater includes an aperture that extends through the electrically insulating material, the heater may be placed between a fluid component and a fluid substrate and used to heat both.

40 Claims, 5 Drawing Sheets

U.S. PATENT DOCUMENTS

| | | |
|---|---|---|
| 6,300,607 B1 | 10/2001 | Steinhauser et al. |
| 6,302,141 B1 | 10/2001 | Markulec et al. |
| 6,337,470 B1 | 1/2002 | Von Arx et al. |
| 6,374,859 B1 | 4/2002 | Vu et al. |
| 6,392,208 B1 | 5/2002 | Arx |
| 6,394,138 B1 | 5/2002 | Vu et al. |
| 6,432,344 B1 | 8/2002 | Eckman et al. |
| 6,433,317 B1 | 8/2002 | Arx et al. |
| 6,434,328 B1 | 8/2002 | Rutherford |
| 6,516,142 B1 | 2/2003 | Grant et al. |
| 6,519,835 B1 | 2/2003 | Von Arx et al. |
| 6,539,171 B1 | 3/2003 | Von Arx et al. |
| 6,541,744 B1 | 4/2003 | Von Arx et al. |
| 6,744,978 B1 | 6/2004 | Tweedy et al. |
| 6,748,646 B1 | 6/2004 | Von Arx et al. |
| 6,845,984 B1 | 1/2005 | Doyle |
| 2001/0014212 A1 | 8/2001 | Rutherford |
| 2002/0090209 A1 | 7/2002 | Von Arx et al. |
| 2004/0129324 A1 | 7/2004 | Vu |
| 2005/0098684 A1 | 5/2005 | Gullerud et al. |
| 2005/0109771 A1 | 5/2005 | Bower et al. |

OTHER PUBLICATIONS

Watlow Product Literature, Kapton® Material, 2001 Watlow Electric Manufacturing Company, 2 pages.

Watlow Product Literature, Flexible Heaters, 2003 Watlow Electric Manufacturing Company, 12 pages.

SURFACE MOUNT HEATER

RELATED APPLICATIONS

This application claims priority under 35 U.S.C. § 119(e) to U.S. Provisional Application No. 60/518,357 filed Nov. 7, 2003, entitled "Surface Mount Heater" which is herein incorporated by reference in its entirety.

BACKGROUND

1. Field of Invention

Aspects of the present invention are directed to a heater, and more particularly to a resistive heater that may be mounted to a surface through which a fluid is conveyed.

2. Discussion of Related Art

In a number of different fluid processing and distribution systems, it can be important to control the temperature of the process fluids (liquids, gases, liquids and gases, slurries, etc.) being used. For example, in the semiconductor industry, cartridge type heaters are frequently inserted into substrates of a fluid stick and used to heat the process fluids that are delivered to a tool. These cartridge type heaters are generally elongated cylindrically shaped resistive-type heaters that are inserted into a cavity or well opening formed in the substrates that are used to convey the fluid to the process tool(s). Commonly owned U.S. patent application Ser. No. 10/650,102, filed Aug. 26, 2003, entitled MODULAR SUBSTRATE GAS PANEL HAVING MANIFOLD CONNECTIONS IN A COMMON PLANE, (hereinafter "the co-pending application"), which is herein incorporated by reference, illustrates a modular substrate gas panel in which the modular substrates have such a cavity formed therein.

As shown in FIG. 17 of the co-pending application, reproduced herein as FIG. 6, gas panel 200 includes a plurality of gas sticks A–L, in which each gas stick includes a pair of cavities 500 within which a cartridge-type heater (not shown) may be inserted. In use, each of the substrates forming a gas stick has similar cavities, such that when the substrates of the gas stick are aligned, the cartridge heater inserted in cavities or well openings 500 may span the length of the gas stick. The cartridge heaters operate by thermally transferring heat to the substrates, which are typically formed from a thermally conductive material, such as stainless steel.

As known to those skilled in the art, cartridge heater efficiency is largely determined by the tolerances and positions of the heater well openings (i.e., cavities) required for cartridge insertion. If a cartridge has too much clearance between the opening wall and the heater sheath (i.e., the outer surface of the cartridge heater), heat transfer rates are reduced, heater sheath temperature increases, and power demands increase. In the semiconductor industry, a major cause of cartridge heater failure is improper insertion into heater wells or improper well design. Cartridge heaters often fail by welding themselves into the well opening when heater sheath temperature exceeds the maximum safe temperature for that heater. This causes service nightmares, as heaters may need to be drilled out before they can be replaced, and also raises numerous potential safety issues.

Cartridge heaters operating properly create very high temperature gradients in the area of the heater wells, as the temperature at the heater surface is often 200% to 500% of the desired system temperature. This causes not only thermal stresses across the gas stick, but also presents a challenge in controlling the temperature in the desired zone, since the heater must be located physically separate from the target zone (i.e., the channel formed in the substrate in which the process fluid flows).

The failure rate of cartridge type heaters can be staggeringly high, and is generally determined more by the installation method than by the heater quality or system design. An improperly installed cartridge heater will lead to rapid heater failure, and in practice, improper installation often cannot be tested or seen until the heater has failed, when it is too late.

SUMMARY OF INVENTION

According to one aspect of the present invention, a heater is provided. The heater comprises a substantially flat layer of electrical resistance material having a first end and a second end, a first electrical conductor electrically connected to the first end of the substantially flat layer of electrical resistance material, a second electrical conductor electrically connected to the second end of the substantially flat layer of electrical resistance material, and an electrically insulating material surrounding the substantially flat layer of electrical resistance material and electrically insulating the first end of the substantially flat layer of electrical resistance material from the second end of the substantially flat layer of electrical resistance material. According to one embodiment, the substantially flat layer of electrical resistance material may be arranged in a serpentine configuration, and the width, thickness, or density of that serpentine configuration may be varied to provide zones having different heating capacity within the heater. The heater may be mounted to a surface of a fluid component and used to heat the fluid component, and where the heater includes an aperture that extends through the electrically insulating material, the heater may be placed between a fluid component and a fluid substrate and used to heat both the fluid component and the fluid substrate. According to a further aspect of this embodiment, the first and second electrical conductors may be formed from the same material as the layer of electrical resistance material.

According to another aspect of the present invention, a method is provided comprising acts of placing a substantially flat heater between a bottom surface of a fluid component and a top surface of a fluid substrate, and securing the fluid component to the fluid substrate with the substantially flat heater therebetween. In accordance with one embodiment, the substantially flat heater may include a pair of electrical conductors, and the pair of electrical conductors may be connected to a source of power and the temperature of the heater limited to within ±5° C. of a predetermined temperature, without any external control.

According to another aspect of the present invention, a fluid panel is provided. The fluid panel comprises at least one fluid substrate having a substrate port disposed in a first surface of the at least one fluid substrate, at least one fluid component fastened to the at least one fluid substrate and having a component port disposed in a first surface of the at least one fluid component, the component port of the at least one fluid component being in fluid communication with the substrate port of the at least one fluid substrate, and a substantially flat heater disposed between the first surface of the at least one fluid substrate and the first surface of the at least one fluid component. The fluid component may include a valve, a filter, a regulator, a transducer, a purifier, a mass flow controller, or any other type of fluid component having at least one component port. According to one embodiment, the heater may include a seal that forms a fluid tight joint between the component port and the substrate port. This seal may either be an integral part of the heater, or a separate part that is maintained in a fixed position by the heater.

According to a further aspect of the present invention, a preassembled device is provided for use with a substrate. The preassembled device comprises a fluid component having a base and at least one fluid port formed in the base, a substantially flat heater having at least one aperture, and means for holding the heater to the base of the fluid component prior to assembly with the substrate. In accordance with one embodiment, the means for holding the heater to the base of the fluid component may be integrally formed in the heater.

According to yet another aspect of the present invention, a seal is provided comprising a layer of electrical resistance material having a first end and a second end, and an electrically insulating material surrounding the layer of electrical resistance material. The electrically insulating material has an aperture that extends through the electrically insulating material in a region wherein the layer of electrical resistance material is not present. In accordance with one embodiment, the first and second ends may be electrically connected to a source of power, such that the seal may be used to provide heat.

According to another aspect of the present invention, a seal retainer is provided. The seal retainer comprises a layer of electrical resistance material having a first end and a second end, and an electrically insulating material surrounding the layer of electrical resistance material and having an aperture that extends through the electrically insulating material in a region wherein the layer of electrical resistance material is not present. The seal retainer further comprises means for maintaining a seal in a fixed position within the aperture. Advantageously, the first and second ends may be electrically connected to a source of power, and the seal retainer may be used to provide heat in addition to retaining the seal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
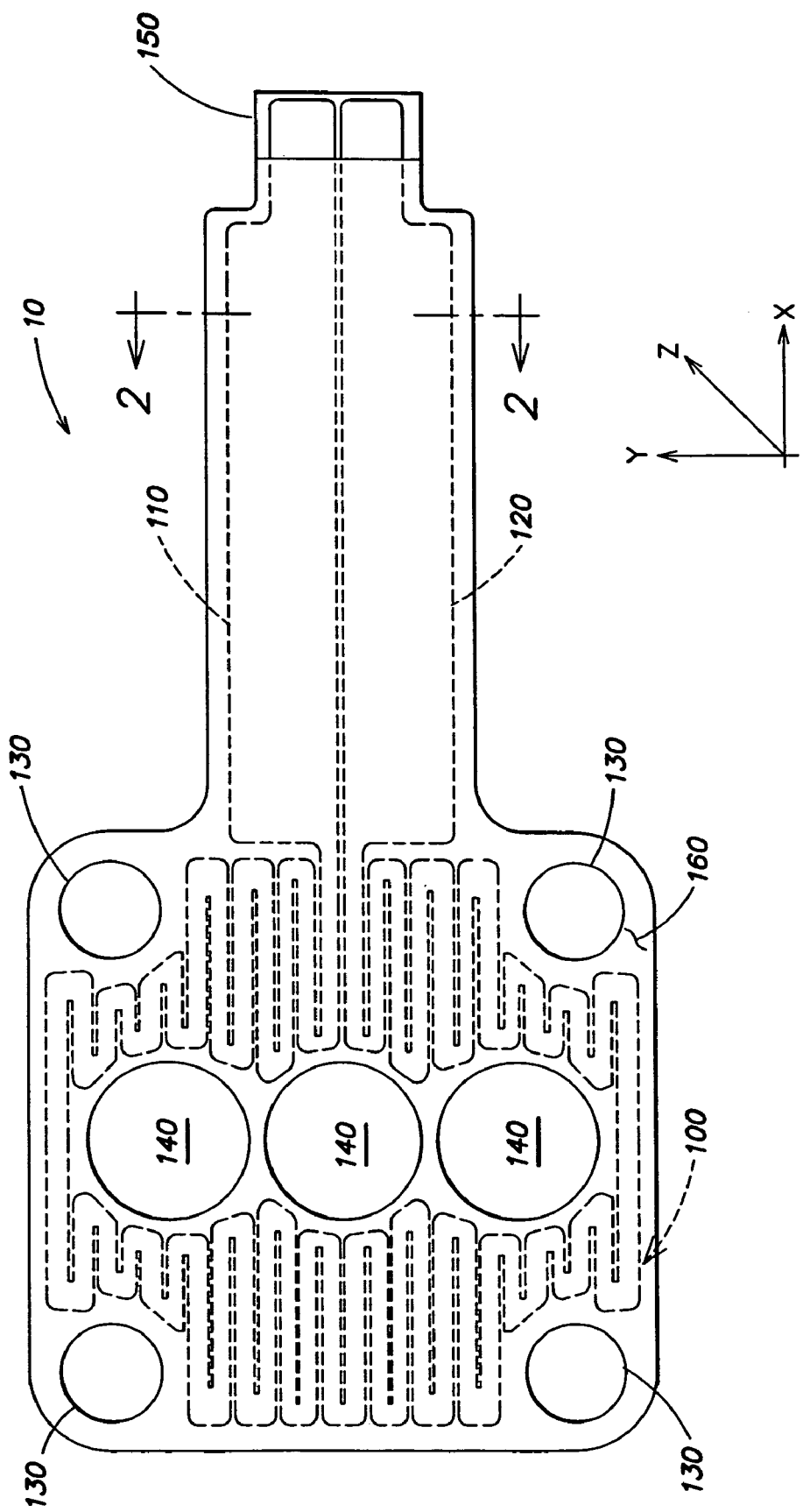
FIG. 1 illustrates a heater that may be surface mounted between a fluid component and a fluid substrate in accordance with one embodiment of the present invention.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

FIG. 1 illustrates a surface mount heater according to one aspect of the present invention. As illustrated, the heater 10 includes a heating element 100 formed from an etched foil resistance material, such as Chromel® foil resistance material, available from Hoskins Manufacturing Company, surrounded by an electrically insulating material 160, such as Kapton® polyimide film, available from E.I. du Pont de Nemours and Company.

Kapton®, a registered trademark of E.I. du Pont de Nemours and Company, is a polyimide film possessing excellent physical and electrical properties. It has superb chemical resistance; there are no known organic solvents for the film, it is certified to meet the requirements of MIL-P-46112 B and of ASTM D-5213-99, and it does not melt or burn. It has the highest UL-94 flammability rating: V-0. Kapton® polyimide film is rated for continuous operation from −269° C. (−452° F.) to 400° C. (752° F.), has a dielectric strength of approximately 7000 volts/mil at 25° C., has no significant thermal expansion or contraction properties, and has no known particle generating properties.

It should be appreciated that materials other than Chromel® and Kapton® may be used, as the present invention is not limited to any particular materials. For example, the heating element 100 may be formed from any type of electrically conductive material, for example, stainless steel, that has a sufficient amount of resistance, such that when an electrical current is passed therethrough, heat is generated. In one embodiment of the present invention, the foil resistance material has a resistance of approximately 22–32 Ohms, although materials having a different electrical resistance may be used, as the present invention is not limited to a particular resistance value or range of resistance values. Further, it should be appreciated that the resistance material need not be etched, as other manufacturing processes may be used to form the heating element 100, such as laser cutting, die stamping, Electrical Discharge Machining (EDM), deposition, etc.

Similarly, although Kapton® and Kapton® MT, and Kapton® MTB are preferred for use as the electrically insulating material 160, other types of insulating materials, such as any other suitable polymer, rubber, plastic, or thermoplastic material may be used. Preferably, these electrically insulating materials are strong, have a high chemical resistance, do not melt or burn, possess minimal thermal expansion and contraction properties, and remain flexible over a wide temperature range. Further, it is preferred that the electrically insulating material 160 have a relatively low thermal impedance, such that some of the heat generated by the heating element 100 is transferred to surrounding surfaces. It should be appreciated that not all of these properties may be required, such that other polymeric or insulating materials may be used. For example, in applications where the process fluids are not generally highly reactive, such as pharmaceutical and biopharmaceutical applications, materials possessing lower chemical resistance may be used.

Figure 3:
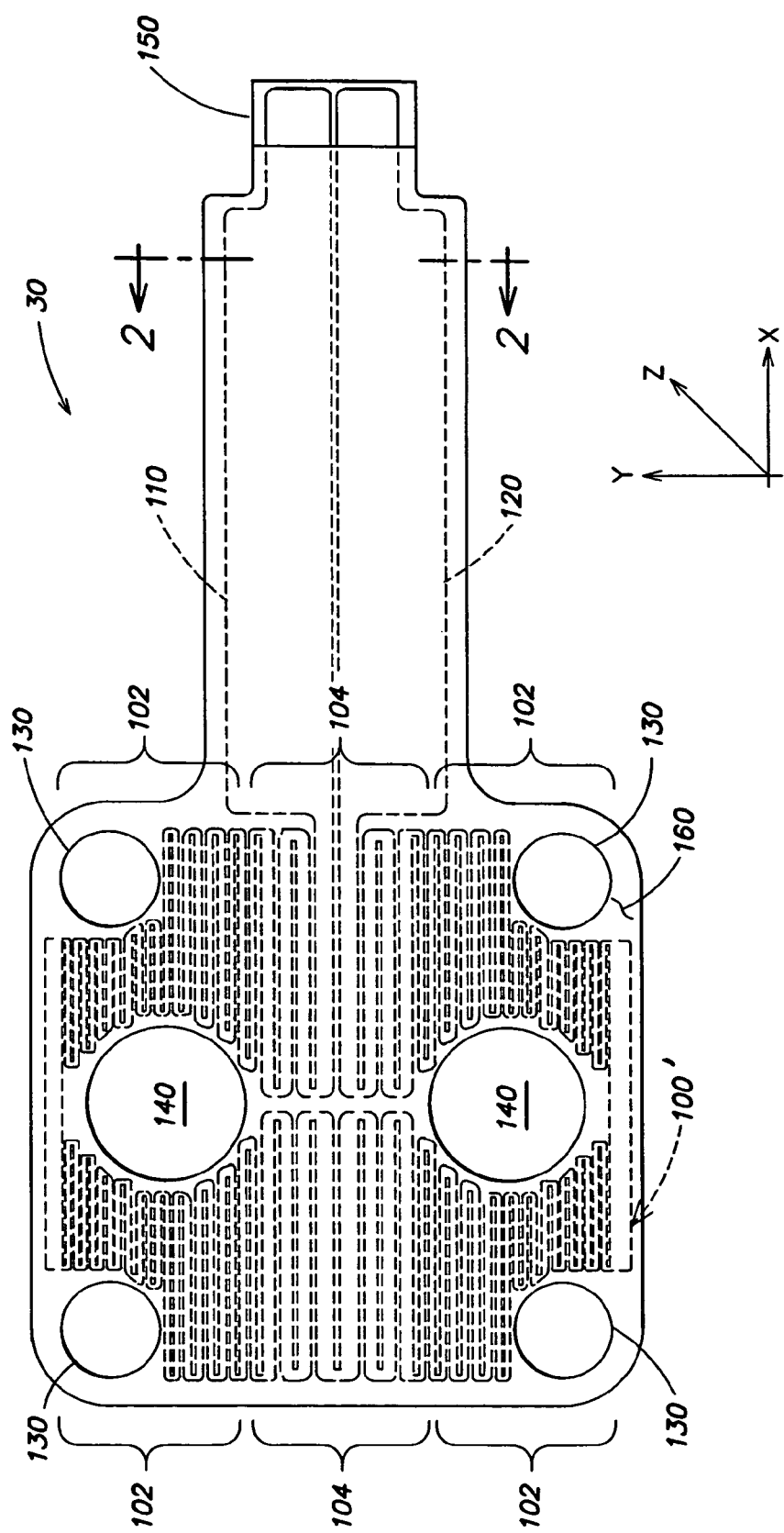
FIG. 3 illustrates a heater that may be surface mounted between a fluid component and a fluid substrate in accordance with another embodiment of the present invention.

As shown in FIG. 1, the heating element 100 is disposed in a serpentine configuration. It should be appreciated that other (e.g., rectilinear) configurations may be used, as the present invention is not limited to a serpentine configuration. In general, the configuration, thickness (i.e., extending out of the plane of FIG. 1 in the ±Z-direction) and width (i.e., extending primarily in the ±Y direction of FIG. 1) of the heating element 100 may be varied depending upon the requirements of the fluid processing and/or distribution system in which it is used. These requirements may include the wattage required to produce the desired operating temperature, the desired heat distribution pattern, the desired uniformity of that heat distribution pattern, etc. For example, as shown in FIG. 3, and described in detail further below, the width, density, shape, and thickness (not shown) of the foil resistance material may be varied to achieve variable watt-densities (wattage per unit area) within an individual heater or amongst different heaters (and even when those different heaters are connected to the same power supply).

As shown, the heating element 100 has a first end that is electrically connected to a first electrical conductor 110 and a second end that is connected to a second electrical conductor 120. Advantageously, the first and second electrical conductors may be formed from the same material as the heating element 100. Where the first and second electrical conductors 110, 120 are formed from the same material as the heating element 100, they may have a greater surface area than the heating element 100, as shown in FIG. 1. Alternatively, the first and second conductors 110, 120 may be thicker, or thicker and wider than the thickness and/or width of the heating element 100. Alternatively still, the first and second electrical conductors may be formed from a more conductive material than the material used to form the heating element 100, such as aluminum, copper, etc.

Electrically connected to the ends of the first and second electrical conductors 110, 120 is a connector 150 that may be used to connect and/or disconnect the first and second electrical conductors to/from a source of AC or DC power. In one embodiment, the connector 150 is an FFC type connector available from Molex Corporation, which permits one to easily replace the heater 10, if necessary. It should be appreciated that the present invention is not limited to any particular type of connector, as any connection that is capable of being used to electrically connect the first and second electrical conductors 110, 120 to a source of power may be used instead.

In the illustrated embodiment of FIG. 1, the heater 10 includes a plurality of apertures formed therein that may allow a process fluid or a fastener to pass therethrough. For example, the heater 10 includes four apertures 130 disposed at the four corners of the heater 10 through which fasteners may pass to secure a surface (e.g., the bottom surface) of a fluid component to a mating surface (e.g., the top surface) of a substrate. A retainer, such as a C-ring, may be placed on the distal end of one or more of the fasteners to retain the fasteners together with the fluid component, such that the fluid component and the one or more fasteners may be installed or removed as a single unit. The retainer(s) may also be used to retain the heater 10 on the bottom surface of the base of the fluid component, such that the fluid component, the heater, and the fasteners may all be installed or removed as a single unit. Alternatively still, the apertures 130 may be dimensioned so that one or more of the fasteners may be threaded therethrough to both retain the heater on the bottom surface of the base of the fluid component and to also retain each fastener within its respective aperture of the fluid component. In this manner, the use of a separate retainer may be avoided, and the fluid component, the heater, and the fasteners may all be installed or removed as a single unit.

As used herein, the term fluid component includes active and passive fluid components such as valves, regulators, purifiers, analyzers, transducers, filters, etc. (whether fastened directly to a substrate, or attached to a mounting flange that is then fastened directly to a substrate), as well as connectors that convey fluid from one substrate to another. As used herein, the term substrate includes individual modular substrates that fluidly connect pairs of adjacent fluid components, as well as manifolds that fluidly connect a number of fluid components, such as described in commonly owned U.S. Pat. Nos. 5,992,463, 6,283,155, 6,293,310, 6,374,859, 6,394,138, and the co-pending application, which are herein incorporated by reference in their entirety.

The heater 10 also includes one or more apertures 140 through which a process fluid may flow. In the illustrated embodiment, the heater 10 includes three apertures 140, and may be used with a three port component, such as a valve. Although the embodiment illustrated in FIG. 1 is specifically adapted for use with the KIS line of process fluid systems from Celerity Group, Inc. of Santa Clara Calif., the position, size, and number of apertures formed in the heater 10 may be varied depending upon the requirements of the fluid processing and/or distribution system. Examples of fluid processing and/or distribution systems with which embodiments of the present invention may be used include those described in commonly owned U.S. Pat. Nos. 5,836,355, 5,992,463, 6,283,155, 6,293,310, 6,302,141, 6,374,859, 6,394,138, and the co-pending application, as well as surface mount fluid processing and/or distribution systems available from others, such as the Swagelok Company, Fujikin Incorporated, CKD Corporation, and others.

In use, the heater 10 may be placed atop the upper surface of a substrate, and a fluid component may be placed above the heater 10. Alternatively, the fluid component with the heater 10 retained on the bottom surface thereof may be placed atop the upper surface of the substrate. The fluid component may then be secured to the substrate in the manner illustrated in FIG. 27 of U.S. Pat. No. 6,293,310. Advantageously, the heater 10 may include means for maintaining a seal, such as a deformable metal seal, a W-Seal, a C-seal, a Z-Seal, a V-Seal, or other types of seals, such as polymeric or elastomeric seals, etc. in a fixed position within the heater 10. This means may include a circumferential groove formed in a sidewall of an aperture 140 (FIG. 1) through which the process fluid may flow, a plurality of fingers that protrude from the sidewall of the aperture 140, or any other structure capable of maintaining the seal in a fixed position within the heater 10. One example of such a means for maintaining a seal in a fixed position is described with respect to FIGS. 12 and 13 of U.S. Pat. No. 6,293,310. Other examples of means for maintaining a seal in a fixed position include those described in U.S. Pat. Nos. 5,984,318 and 5,730,448, although it should be appreciated that other means may be used, and the type of means for maintaining the seal in a fixed position may vary depending upon the type of seal used. It should be appreciated that by incorporating this means within the heater 10, the use of a separate seal retainer may be avoided.

In one embodiment, the heater 10 is specifically adapted to retain a C-seal. In this embodiment, the heater replaces the C-seal retainer that holds the C-seal gaskets in place between the substrate and flow components. The heater may be the same thickness as conventional C-seal retainers (e.g., approximately 5 mils; 0.13 mm nominal) and because of the physical stability and uniformity of Kapton® material, the heaters perform as well as or better than a conventional C-seal retainer. It should be appreciated that thickness of the heater may vary dependent upon desired operating temperature of the heater, and/or the thickness of the sealing gasket used in its compressed (i.e., sealing) state. In general, where the heater is used to retain a seal, the thickness of the heater should be sufficiently less than the thickness of the sealing gasket in its compressed state to avoid any leakage of fluid.

Such positioning between a fluid component and a substrate allows the heater to be in direct thermal contact with the valve, MFC, or other fluid component bodies and places the heater into the middle of the target heat zone (e.g., the fluid flow path) rather than far away in a heater well. As a result of this placement, the target zone reaches the desired temperature more quickly than with a conventional cartridge-type heater, and the heater need not be heated to well above (e.g., 200% to 500% above) the desired temperature as with a conventional cartridge-type heater. This permits superior system temperature control as compared to conventional designs using cartridge heaters, avoids the use of a separate temperature control circuit, and provides a much greater degree of accuracy in temperature design. Achieving a target of 40° C.±5° C. stable system temperature was easily accomplished using such heaters (see example data further below).

In an alternative embodiment, a portion of the heater 10 may be used as a seal. That is, rather than using the heater 10 to maintain a separate seal in a fixed position, the seal may be formed integrally with the heater. For example, where the outer surfaces of the heater 10 are formed from a chemically inert material such as Kapton®, such a seal may even be used with highly reactive process fluids conventionally used in semiconductor manufacturing applications. The heating element 100 may or may not extend into the region of the heater used to form a leak tight seal. It should be appreciated that where a portion of the heater is used as a seal, that portion will generally be sufficiently thicker than the remaining portions of the heater to allow for compression of the sealing portion and the formation of a fluid tight seal.

Figure 2:
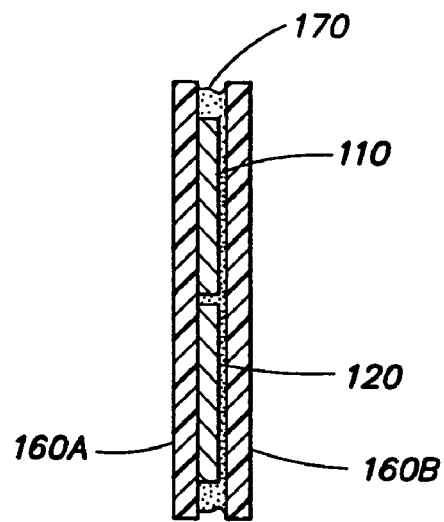
FIG. 2 illustrate a cross-sectional view of the heater of FIG. 1.

FIG. 2 is a cross-sectional view of the heater of FIG. 1 taken along lines 2—2 in FIG. 1. As illustrated, the heater 10 includes a first layer of electrically insulating polymeric material 160A, a second layer of electrically insulating polymeric material 160B, and a layer of electrical resistance material that forms either the heating element 100 (not shown) or the first and second electrical conductors (110, 120) disposed between the first and second layers 160A, 160B of electrically insulating polymeric material. The first and second layers of electrically insulating polymeric material may be formed from the same polymeric material, or from different materials. In accordance with one embodiment of the present invention, the layer of electrical resistance material may be formed by etching the electrical resistance material in a conventional manner. Other processes that may be used to form the layer of electrical resistance material may include laser cutting, die-stamping, EDM, deposition, etc., as the present invention is not limited to a particular method of forming the electrical resistance material layer. One or both of the inner surfaces of the electrically insulating polymeric material may be coated with an adhesive 170, such as PFA Teflon®, and the entire assembly vulcanized in a heated press, such as a heated vacuum press, to form an integrated assembly. It should be appreciated that other methods of manufacture may alternatively be used, as the present invention is not limited to any particular process.

FIG. 3 illustrates a heater that may be surface mounted between a fluid component and a fluid substrate in accordance with another embodiment of the present invention. As in the embodiment described previously with respect to FIGS. 1 and 2, the heater 30 includes a heating element 100' formed from an etched foil resistance material surrounded by an electrically insulating material 160. The heating element 100' has a first end that is again electrically connected to a first electrical conductor 110, and a second end that is connected to a second electrical conductor 120. As with the previously described embodiment, the first and second electrical conductors 110, 120 may be formed from the same material as the heating element 100', or from different materials, and the width, thickness, and/or surface area of the first and second electrical conductors 110, 120 may vary from the width, thickness, and/or surface area of the material forming the heating element 100'. As in the previously described embodiment, a connector 150 may be electrically connected to the ends of the first and second electrical conductors 110, 120 to connect and/or disconnect the first and second electrical conductors to/from a source of AC or DC power.

As in the embodiment of FIG. 1, the heater 30 includes a plurality of apertures 130 disposed at the four corners of the heater 30 through which fasteners may pass through to secure a bottom surface of a fluid component to a top surface of a substrate. The heater 30 also includes one or more apertures 140 through which a process fluid may flow. In contrast to the embodiment illustrated in FIG. 1, the heater 30 includes only two apertures 140, and may be used with a two port component, such as a valve, a regulator, a filter, a passive connector block, etc. As with the previous embodiment, the position, size, and number of apertures formed in the heater 30 may be varied depending upon the requirements of the fluid processing and/or distribution system and the type of fluid component (and/or substrate) with which the heater 30 is used.

Although the heating element 100' is again disposed in a serpentine configuration in a manner similar to that of the embodiment shown in FIG. 1, rather than having a substantially uniform width, the width and density of the heating element 100' differs from one region to another. In particular, the width and density of the heating element 100' is varied to create zones where the watt-density differs from that of other zones. For example, in the illustrated embodiment of FIG. 3, the heater 100' includes four zones 102 surrounding apertures 140 where the watt-density of the heating element 100' is increased relative to other zones 104. This increase in the watt-density may be achieved by making the width of the heating element 100' smaller and increasing the number of serpentine turns made in a given area. An increase in the watt-density may also be achieved by making the thickness of the heating element thinner, or by a combination of such techniques. It should be appreciated that although each of the four zones 102 is similar in construction, the present invention is not so limited. In this regard, a number of different zones may be provided, each providing a different watt-density. Moreover, it should be appreciated that the configuration of the heater 100' need not be serpentine, as other configurations may be used instead.

As with the previously described embodiment of FIG. 1, the heater 30 may include means for maintaining a seal in a fixed position within the heater 30. This means may include a circumferential groove formed in a sidewall of an aperture 140 through which the process fluid may flow, a plurality of fingers that protrude from the sidewall of the aperture, or any other structure capable of maintaining the seal in a fixed position within the heater 30. Alternatively, a portion of the heater 30 may be used as a seal, such that the seal is formed integrally with the heater. For example, where the outer surfaces of the heater 30 are formed from a chemically inert material such as Kapton®, such a seal may even be used with highly reactive process fluids conventionally used in semiconductor manufacturing applications.

Figure 4:
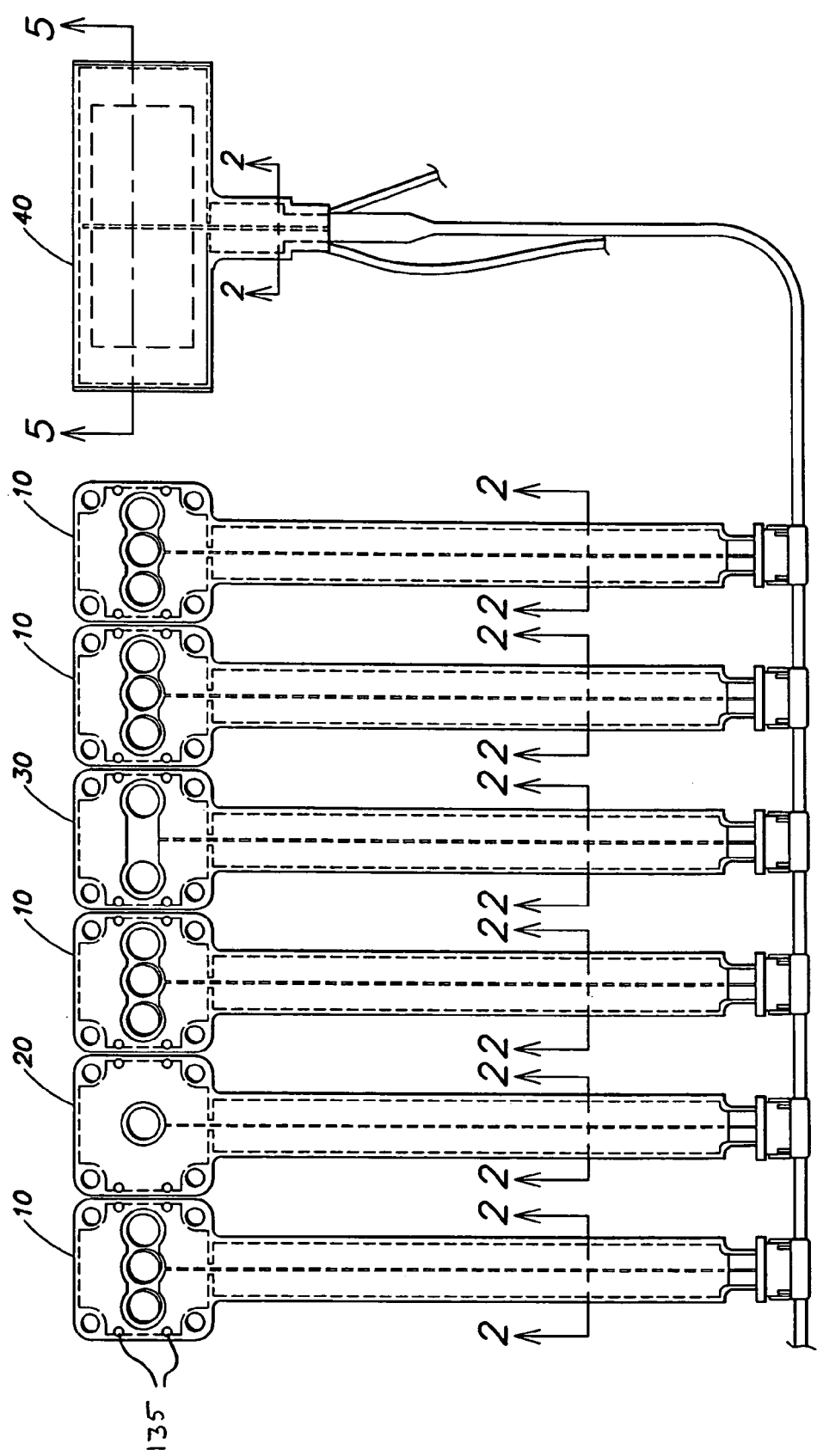
FIG. 4 illustrates a heating system that may be used to heat individual elements of a fluid stick in accordance with an embodiment of the present invention.
Figure 6:
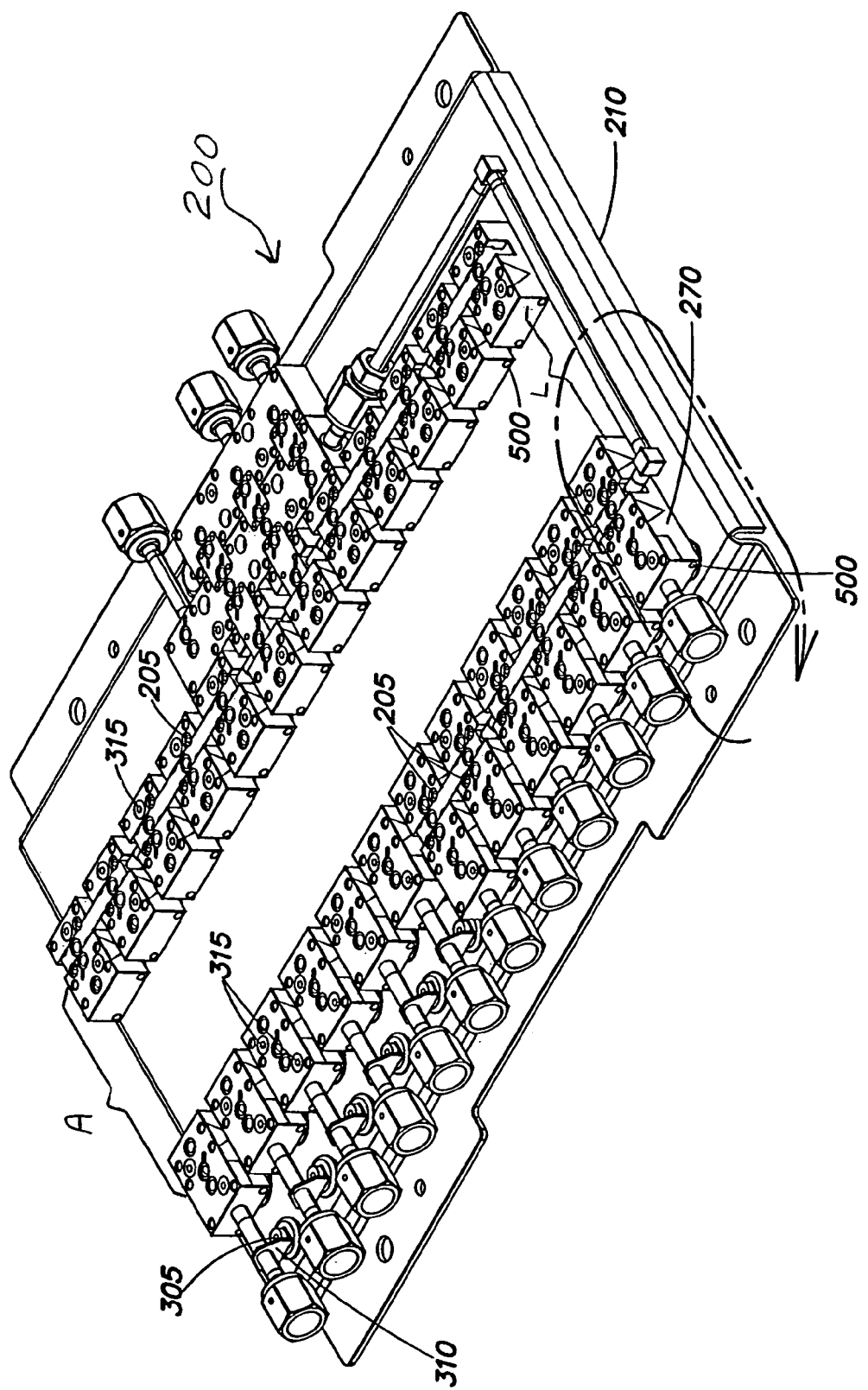
FIG. 6 illustrates a modular substrate gas panel that includes cavities within which a conventional cartridge-type heater may be inserted.

FIG. 4 illustrates a plurality of heaters in accordance with various aspects of the present invention that may be used in a fluid stick of a fluid processing and/or distribution system to control the temperature of process fluids used therein. As illustrated, the plurality of heaters includes a first plurality of heaters 10 adapted for use with fluid components having three ports, such as valves, a heater 30 adapted for use with fluid components having two ports, such as a valve, a pressure regulator, a filter, etc., and another heater 20 adapted for use with a single port component, such as a pressure transducer. In addition to apertures 130 dimensioned to receive a fastener and one or more apertures 140 through which a process fluid may flow (see FIGS. 1 and 3), each of heaters 10, 20, and 30 also includes one or more apertures 135 which may be used to detect a leak. The plurality of heaters also includes a heater 40 in accordance with another embodiment of the present invention. As many of the details of the construction of the heater 40 are similar to those described previously with respect to the embodiments of FIGS. 1–3, details that are in common with the embodiments of FIGS. 1–3 are described only briefly herein.

As in the embodiments described previously with respect to FIGS. 1–3, the heater 40 includes a heating element (not shown) formed from an etched foil resistance material surrounded by an electrically insulating material 160. The configuration, thickness, and/or width of the heating element may be varied to achieve different zones of heating depending upon the requirement of the system in which it is used, as described previously with respect to FIG. 3. As in the previous embodiments, the heating element has a first end that is electrically connected to a first electrical conductor, and a second end that is connected to a second electrical conductor, with each end being electrically connected to a connector. As with the previous embodiments, the connector may be used to connect and/or disconnect the first and second electrical conductors to/from a source of AC or DC power.

In contrast to the embodiments described previously with respect to FIGS. 1–3, the heater 40 illustrated in FIG. 4 is adapted to be mounted to an outer surface of a fluid component, rather than between a fluid component and a substrate. For example, in the embodiment of FIG. 4, the heater 40 is adapted to be mounted to a body of a fluid component, such as a mass flow controller, and for this reason, need not include any apertures 140 (FIGS. 1, 3) through which a process fluid may flow. Where the mass flow controller is configured such that its sensor, control, and valve portions all extend from one surface (e.g., the top surface) of the mass flow controller body, the heater 40 may be mounted to the bottom surface of the mass flow controller body, or to either side surface of the mass flow controller body. If desired, separate heaters 40 may be mounted to more than one such surface of the body of the fluid component. Alternatively, because the heater 40 is relatively flexible and may easily conform to any desired shape, a single heater may be used having a U-like shape that is mounted to the bottom and both side surfaces of the body of the fluid component. Where desired, an additional heater similar in construction to the embodiments illustrated in FIGS. 1–3 may be disposed between the valve of the mass flow controller and the body of the mass flow controller. It should be appreciated that the dimensions of the heater 40 may be varied to accommodate a wide variety of fluid components, as the present invention is not limited to any particular type of fluid component, such as a mass flow controller.

Various means may be used to mount the heater 40 to the body of the fluid component. For example, thermally conductive adhesives or adhesive tapes, such as Thermally Conductive Adhesive Transfer Tapes 8805, 8810, 8815, 8820, available from 3M Corporation, may be used to mount the heater 40 to the body of the fluid component. Alternatively, rather than adhesively mounting the heater to the body of the fluid component, a mounting structure such as that depicted in FIG. 5 may be used.

Figure 5:
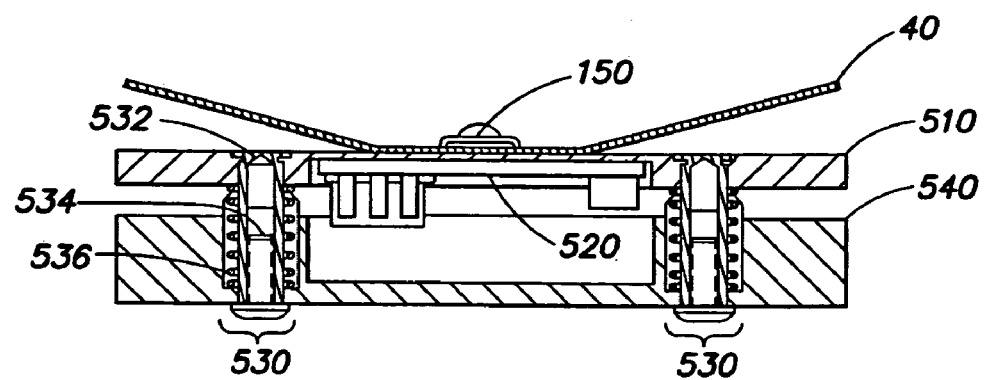
FIG. 5 illustrates a mounting structure that may be used to mount a heater to a base of a fluid component, such as a mass flow controller, in accordance with another embodiment of the present invention.

FIG. 5 illustrates a cross-sectional view of the heater 40 taken along lines 5—5 attached to a mounting structure that may be used to place a heater in thermal contact with a surface of a body of a fluid component according to one embodiment of the present invention. In broad overview, the heater 40 sits atop the mounting structure which resiliently urges the top surface of the heater 40 in registration with the bottom surface of the fluid component (not shown). Although the mounting structure illustrated in FIG. 5 is adapted to mount a heater, such as heater 40 (FIG. 4), to a bottom surface of a fluid component, such as a mass flow controller, it should be appreciated that it may be used with other types of fluid components and in other orientations.

As shown in the embodiment depicted in FIG. 5, the heater 40 is mounted to a plate 510 using an adhesive (not shown). In one embodiment, a two-sided adhesive film or tape is used, although other methods may alternatively be used. For example, because the heater 40 is mounted to the top surface of the plate 510, and the plate is pressed upwardly against the bottom surface of the fluid component, any form of mounting may be used, as a great deal of strength is not required to hold the heater 40 in place on the plate 510. In one embodiment of the present invention, the plate 510 may be formed from aluminum, although any relatively rigid material may be used, including metals, plastics, etc.

As shown a printed circuit board 520 is mounted to the under-surface of the plate 510 in an area that is recessed within the plate, although the plate need not include such a recess. In one embodiment, the printed circuit board 520 is mounted to the plate using an epoxy, such as Hysol®, although other types of adhesives or other types of mounting (e.g., screws, rivets, etc.) may be used. The printed circuit board 520 includes a thermally activated switch that identifies when the fluid component to which the heater 40 is mounted has reached a predetermined temperature. For example, a thermocouple (not shown) may be placed on the fluid component to which the heater 40 is mounted, and the signal from that thermocouple may be provided to the thermally activated switch on the printed circuit board 520. Upon an indication that the fluid component has reached a desired temperature, the thermally activated switch may send an appropriate signal to a controller indicating that the desired temperature has been attained, and that fluid flow may be initiated. Alternatively, the thermocouple or an integrated temperature sensing circuit may be mounted on the printed circuit board 520, particularly where the thermocouple or sensing circuit is mounted to a thermally conductive surface, such as the bottom surface of the plate 510.

Attached to the plate 510 is a plurality of resiliently biased stand-offs 530 that attach the plate 510 to a base 540, which in one embodiment may be a base of a fluid processing and/or distribution system panel. Each of the resiliently biased stand-offs 530 includes a stand-off 532, a threaded fastener 534, and a spring 536. In one embodiment, the stand-off 532 may be an off-the-shelf stand-off, such as a PEM™ Press-Fit stand-off available from Penn Engineering of Danboro, Pa. The stand-off 532 may be press fit into an appropriately sized aperture in the plate 510, and internally threaded to receive a threaded end of a fastener, such as fastener 534. The fastener 534, may be a conventional threaded fastener, such as a screw, and may be inserted into the internally threaded stand-off 532 from below the base 540 and threaded into the stand-off 532, with the spring 536 surrounding the distal ends of the stand-off 532 and the fastener 534. The distal end of the stand-off 532 may extend through a bore in the base 540, such that the plate 510 may be moved toward the base 540, but when the force is removed, the plate 510 is urged upwardly by the force of the coil spring 536. In one embodiment of the invention, variable length fixed stand-offs may be used to achieve a desired height and couple the base 540 to another mounting surface.

It should be appreciated that embodiments of the present invention offer a number of advantages over conventional cartridge-type heaters. For example, since each fluid component in a fluid distribution and/or processing system may be heated individually, different temperature zones can be easily created, whether within a particular fluid component or among different fluid components. It should be appreciated that this ability to individually heat different fluid components (or different zones within a component) to different temperatures may be provided by controlling one or more of the width, thickness, length, configuration, and resistance of the etched foil resistance material, even though each of the heaters is electrically connected to the same source of power. The heat load of each component may be calculated, and the precise wattage needed to accomplish the target operating temperature for that component may be used. For example, the amount of power provided by the source of power may be selected to be equal to the amount of power dissipated as heat by the heater at the target operating temperature plus the amount of power sunk by (i.e., the heat capacity of) the fluid component or fluid component/fluid substrate combination.

The target operating temperature that the heater is designed to attain may be any value up to the rated operating range of the materials used in the construction of the heater (e.g., up to approximately 400° C. for Kapton®). Further, Applicants have found that using conventional processes to cut or etch the electrical resistance material, heaters that provide a target operating temperature within a tolerance range of ±5° C. are readily achieved, and that through the use of tighter design tolerances, target operating temperature values within a tolerance range of ±1° C. have been provided.

Each heater becomes self-limiting, in that as the electrical resistance material heats up, its internal resistance increases until it "self-limits" the current drawn at a predictable temperature and will get no hotter; thus, there is no need for external temperature controllers. Such flexibility in design that permits fluid flow components and/or discrete portions of a fluid processing and/or distribution system to be individually heated is not possible with a conventional cartridge-type heater, which is typically common to all the fluid flow components of a fluid stick. With a conventional cartridge-type heater, one must typically pick and choose from among a variety of standard cartridge-type heaters, and thus, the ability to achieve a particular target operating temperature is quite limited. Further, because heaters according to the present invention can distribute their heat over a larger surface area than conventional cartridge-type heaters, and since they may be placed in the middle of the intended target heat zone, they may operate at much lower surface temperatures than is possible with cartridge heaters. In particular, where the heater is placed between a fluid component and a fluid substrate, the temperature that the heater is designed to attain may be the same as the target operating temperature. Power utilization is also much more efficient than in cartridge heaters, and total system power consumption is lower. Where the heaters also replace conventional C-seal or other type of seal retainers, or where the seal is integrated into the heater, they eliminate not only the cost of cartridge heaters but also the cost of separate seal retainers and/or seals.

Other advantages include that the substrates need not be uniquely manufactured to receive a heater, and heaters in accordance with the present invention may be retrofitted to existing fluid processing and/or distribution systems that do not already have cavities to receive cartridge-type heaters formed therein. Further, the heaters of the present invention may be installed from above, and therefore do not require as much working space as a conventional cartridge type heater. It should be appreciated that in a conventional cartridge-type heater, a significant amount of space must be provided so that the cartridge heater may be inserted and/or removed from the cavity within which it is received.

It should be appreciated that although each of the heaters described herein is a substantially flat structure, the present invention is not so limited. In this regard, heaters of the present invention are relatively flexible, and thus may conform to a variety of shapes. Moreover, it should be appreciated that during the vulcanization process, the heater may be molded to assume nearly any desired shape, such that it may be molded to form a cylindrical structure, a frusto-conical structure, etc.

EXAMPLE DATA

Heaters in accordance with one embodiment of the present invention were tested on a K1S fluid stick, available from Celerity Group, Inc. that included a manual 2-way valve, a regulator, a transducer, a filter, two pneumatic valves, and an MFC (Mass Flow Controller). This fluid stick was from a 16-stick configuration and included a heater for each of the six fluid components and for the MFC. The heaters were designed to be self limiting to keep the fluid stick at a temperature of 40° C.±5° C. The heaters were connected to an 18 AWG wire harness that was rated at 200° C. (Teflon insulation.) The heaters were configured such that the first three fluid components were in series and the second three were in series, with the two groups of three being in parallel with the MFC. The heaters were powered by a 24VDC power supply.

The stick was placed in a plastic box to simulate a 16-stick box exhaust configuration. Air was drawn through the top lid of the box, down through the stick and out through a 4" exhaust hole under the pallet. Air was drawn through the box at a rate of 120 CFM. The inlet holes in the box were adjusted to achieve a differential pressure inside the box of 0.42 inches H2O.

K-type thermocouples were placed in registration with each of the fluid components, and the system energized from the 24V DC supply. Temperature readings were taken with a calibrated Fluke model 70 hand-held thermometer, and no external temperature controller was used.

RESULTS

Ambient temperature at start: 26.8° C.
Operating Voltage: 24VDC
Total Heater Resistance: 21 Ohms
Exhaust flow rate: 120 CFM
Differential pressure: 0.4 in H2O
Target temperature: 40° C.+/−5° C.

Temperature readings for this illustrative Example are shown below:

| Clock Time (hours:minutes) | Mnl Valve temp. (° C.) | Regulator temp. (° C.) | X-ducer temp. (° C.) | Filter temp. (° C.) | MFC temp. 1 (° C.) | MFC temp. 2 (° C.) | Ambient temp. (° C.) |
|---|---|---|---|---|---|---|---|
| 16:05 (power on) | 26.8 | 26.8 | 26.8 | 26.8 | 26.8 | 26.8 | 26.8 |
| 16:10 | 33 | 35 | 34 | 34 | 34 | 34 | 27 |
| 16:25 | 36 | 37 | 36 | 37 | 37 | 35 | 27 |
| 16:40 | 36 | 38 | 36 | 38 | 37 | 36 | 27.5 |
| 17:00 | 35 | 38 | 37 | 38 | 37 | 36 | 27.6 |
| 17:30 | 35 | 38 | 36 | 38 | 36 | 36 | 26.6 |

The above test results show the heaters were able to bring the system to well within the target range and hold it there. Temperature consistency across the fluid stick was within 3° C. and critical MFC temperature was within 4° of target. This performance far exceeds the best observable performance with standard cartridge heaters. In particular, the same test setup with standard cartridge heaters could not bring the MFC temperature to above 29° C., and there was a much higher temperature difference (approximately 8° C.) among the fluid components forming the stick, with only one component reading (the filter) stabilizing within the 40°±5° tolerance band. The heaters in accordance with the present invention were also able to bring the fluid components to the desired target temperature faster than with the standard cartridge-type heaters, and consumed approximately half the power of standard cartridge-type heaters while requiring no external temperature control or regulation. This better initial performance combined with the predicted longer life, safer design, greater temperature uniformity, elimination of seal retainers, better power utilization, and lower total cost of ownership make such a heater solution a winner for the manufacturer, the OEM equipment supplier and for the end user.

It should be appreciated that although the present invention has been described primarily with respect to fluid processing and/or distribution systems used in the semiconductor industry, the present invention is not so limited. For example, embodiments of the present invention may be used in any application where there is a need or desire for heating, such as pharmaceutical applications, biopharmaceutical applications, process chemical and petrochemical applications, etc. Further, the fluids may be liquid or gas, or a combination of liquid and gas, or slurries. Moreover, the present invention need not be used with face seals, but may be applied to conventional VCR® type fittings or threaded coupling type seals.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A heater, comprising:
    a substantially flat layer of electrical resistance material having a first end and a second end;
    a first electrical conductor electrically connected to the first end of the substantially flat layer of electrical resistance material;
    a second electrical conductor electrically connected to the second end of the substantially flat layer of electrical resistance material; and
    an electrically insulating material surrounding the substantially flat layer of electrical resistance material and electrically insulating the first end of the substantially flat layer of electrical resistance material from the second end of the substantially flat layer of electrical resistance material;
    wherein the heater includes an aperture, extending through the electrically insulating material, adapted to mate with a port formed in a surface of at least one of a fluid component and a fluid substrate.

2. The heater of claim 1, wherein:
    the first and second electrical conductors each have a first end, a second end, and a length;
    the first end of the first electrical conductor is electrically connected to the first end of the substantially flat layer of electrical resistance material;
    the first end of the second electrical conductor is electrically connected to the second end of the substantially flat layer of electrical resistance material; and
    wherein the electrically insulating material further surrounds the first end and the length of the first and second electrical conductors and electrically insulates the first end and the length of the first electrical conductor from the first end and the length of the second electrical conductor.

3. The heater of claim 2, wherein the electrically insulating material further insulates the second end of the first electrical conductor from the second end of the second electrical conductor.

4. The heater of claim 3, wherein the first and second electrical conductors are formed from a same material as the substantially flat layer of electrical resistance material, and wherein at least one of a width and thickness of the first and second electrical conductors is greater than at least one of the width and thickness of the substantially flat layer of electrical resistance material, respectively.

5. The heater of claim 4, further comprising:
    means for retaining a seal within the aperture.

6. The heater of claim 5, further comprising:
    a seal secured within the means for retaining the seal.

7. The heater of claim 4, wherein the heater further includes a seal, formed integrally with the heater, that extends about a periphery of the aperture.

8. The heater of claim 4, wherein the electrical resistance material is an electrical foil resistance material.

9. The heater of claim 8, wherein the electrically insulating material is an electrically insulating polymeric material.

10. The heater of claim 9, wherein the electrically insulating polymeric material includes a first layer of the electrically insulating polymeric material formed on a first side of the substantially flat layer of electrical resistance material, and a second layer of the electrically insulating polymeric material formed on a second side of the substantially flat layer of electrical resistance material, the second side opposing the first side.

11. The heater of claim 10, wherein the heater further includes an adhesive that bonds the first layer of insulating polymeric material to the second layer of insulating polymeric material.

12. The heater of claim 10, wherein the first and second layers of insulating polymeric material are heated under pressure with the substantially flat layer of electrical resistance material therebetween to form an integral assembly.

13. The heater of claim 12, wherein the substantially flat layer of electrical resistance material includes a first zone and a second zone, and wherein the first zone provides a different amount of heat per unit area than the second zone when the first and second electrical conductors are connected to a same power supply.

14. The heater of claim 13, wherein the substantially flat layer of electrical resistance material has a width, a thickness, and a density, and wherein at least one of the width, the thickness, and the density of the substantially flat layer of electrical resistance material differs in the first zone relative to the second zone.

15. The heater of claim 14, further comprising:
a connector, electrically connected to the first and second electrical conductors, to removably connect the heater to the same power supply.

16. The heater of claim 10, wherein the aperture is a first aperture, and wherein the heater further includes a plurality of second apertures, extending through the electrically insulating polymeric material and disposed about a periphery of the heater, adapted to receive a corresponding plurality of fasteners to fasten the heater to the surface of at least one of the fluid component and the fluid substrate.

17. The heater of claim 1, further comprising a power supply electrically connected to the first and second electrical conductors.

18. The heater of claim 1, further comprising:
means for retaining a seal within the aperture.

19. The heater of claim 18, further comprising:
a seal secured within the means for retaining the seal.

20. The heater of claim 1, wherein the heater further includes a seal, formed integrally with the heater, that extends about a periphery of the aperture.

21. The heater of claim 1, wherein the aperture is a first aperture, and wherein the heater further includes a plurality of second apertures, extending through the electrically insulating material and disposed about a periphery of the heater, adapted to receive a corresponding plurality of fasteners to fasten the heater to the surface of at least one of the fluid component and the fluid substrate.

22. The heater of claim 1, wherein the heater includes a plurality of apertures, extending through the electrically insulating material, adapted to mate with a corresponding plurality of ports formed in a surface of at least one of a fluid component and a fluid substrate.

23. The heater of claim 22, further comprising:
means for retaining a seal within each of the plurality of apertures.

24. The heater of claim 23, further comprising:
a plurality of seals secured within each of the plurality of apertures.

25. The heater of claim 22, wherein the heater further includes a plurality of seals, formed integrally with the heater, that extend about a periphery of each of the plurality of apertures.

26. The heater of claim 22, wherein the plurality of apertures is a first plurality of apertures, and wherein the heater further includes a second plurality of apertures, extending through the electrically insulating material and disposed about a periphery of the heater, adapted to receive a corresponding plurality of fasteners to fasten the heater to the surface of at least one of the fluid component and the fluid substrate.

27. The heater of claim 1, wherein the electrical resistance material is an electrical foil resistance material, and wherein the electrically insulating material is an electrically insulating polymeric material.

28. The heater of claim 27, wherein:
the electrically insulating polymeric material includes a first layer formed on a first side of the substantially flat layer of electrical resistance material, and a second layer formed on a second side of the substantially flat layer of electrical resistance material that is opposite to the first side; and
the first and second layers of insulating polymeric material are heated under pressure with the substantially flat layer of electrical resistance material therebetween to form an integral assembly.

29. The heater of claim 1, wherein the substantially flat layer of electrical resistance material includes a first zone and a second zone, and wherein the first zone provides a different amount of heat per unit area than the second zone when the first and second electrical conductors are connected to a same power supply.

30. The heater of claim 29, wherein the substantially flat layer of electrical resistance material has a width, a thickness, and a density, and wherein at least one of the width, the thickness, and the density of the substantially flat layer of electrical resistance material differs in the first zone relative to the second zone.

31. The heater of claim 1, wherein the first and second electrical conductors are formed from a same material as the substantially flat layer of electrical resistance material, and wherein at least one of a width and thickness of the first and second electrical conductors is greater than at least one of the width and thickness of the substantially flat layer of electrical resistance material, respectively.

32. The heater of claim 1, wherein the substantially flat layer of electrical resistance material is arranged in a serpentine configuration.

33. The heater of claim 1, wherein the substantially flat layer of electrical resistance material is dimensioned to self-limit the heater to a predetermined temperature within ±5° C. when connected to a power supply having a predetermined voltage.

34. The heater of claim 1, wherein the heater has a first and substantially flat surface that faces a first direction and a second and substantially flat surface that faces a second direction that is opposite the first direction, the heater further comprising:
a plate that is mounted to the first and substantially flat surface of the heater; and
means, connected to the plate, for resiliently urging the second and substantially flat surface of the heater in thermal contact with a flat surface of the fluid component.

35. A preassembled device for use with a fluid substrate, comprising:
a fluid component having a base and at least one fluid port formed in the base;

a substantially flat heater having at least one aperture; and means for holding the heater to the base of the fluid component prior to assembly with the substrate.

36. The preassembled device of claim 35, wherein the means for holding includes means for aligning the at least one aperture of the heater with the at least one fluid port formed in the base.

37. The preassembled device of claim 35, further comprising:

at least one fastener retained within the base of the fluid component and extending through the base for connection to the fluid substrate; and means for holding the at least one fastener to the base prior to assembly of the fluid component with the fluid substrate.

38. The preassembled device of claim 37, wherein the means for holding is integrally formed in the heater.

39. The preassembled device of claim 37, wherein the means for holding includes at least one C-ring.

40. The preassembled device of claim 35, wherein the fluid component is one of a valve, a filter, a transducer, a regulator, a purifier, a mass flow controller, and an analyzer.

* * * * *